United States Patent
Kumar et al.

(10) Patent No.: US 11,937,013 B2
(45) Date of Patent: Mar. 19, 2024

(54) METHOD FOR VIDEO PROCESSING, AN ELECTRONIC DEVICE FOR VIDEO PLAYBACK AND A VIDEO PLAYBACK SYSTEM

(71) Applicant: GDC Technology (Shenzhen) Limited, Shenzhen (CN)

(72) Inventors: Pranay Kumar, North Point (HK); Man Nang Chong, North Point (HK)

(73) Assignee: GDC Technology (Shenzhen) Limited, Shenzhen (CN)

( * ) Notice: Subject to any disclaimer, the term of this patent is extended or adjusted under 35 U.S.C. 154(b) by 41 days.

(21) Appl. No.: 17/521,796

(22) Filed: Nov. 8, 2021

(65) Prior Publication Data
US 2023/0144732 A1 May 11, 2023

(51) Int. Cl.
*H04N 7/01* (2006.01)
*H04N 21/4402* (2011.01)

(52) U.S. Cl.
CPC ......... *H04N 7/0127* (2013.01); *H04N 7/0117* (2013.01); *H04N 7/0137* (2013.01); *H04N 21/440281* (2013.01)

(58) Field of Classification Search
CPC .. H04N 7/0127; H04N 7/0117; H04N 7/0137; H04N 21/440281
See application file for complete search history.

(56) References Cited

U.S. PATENT DOCUMENTS

| | | | | |
|---|---|---|---|---|
| 2012/0134646 A1* | 5/2012 | Alexander | ........... | G11B 27/322 386/E9.011 |
| 2017/0372749 A1* | 12/2017 | Ramaswamy | ......... | G11B 27/28 |
| 2018/0199081 A1* | 7/2018 | Silverman | ........ | H04N 21/43615 |
| 2019/0188479 A1 | 6/2019 | Balasubramanian et al. | | |
| 2019/0349549 A1 | 11/2019 | Weaver | | |
| 2022/0006970 A1* | 1/2022 | Bian | ........................ | H04N 5/06 |

OTHER PUBLICATIONS

Chinese Office Action dated Mar. 9, 2023, for CN Application No. 202010422771.5, with English translation, 24 pages.

* cited by examiner

*Primary Examiner* — Thai Q Tran
*Assistant Examiner* — Jose M Mesa
(74) *Attorney, Agent, or Firm* — Morrison & Foerster LLP

(57) ABSTRACT

The present disclosure relates to a video processing method, an electronic device for video playback, and a video playback system. A video processing method comprises: receiving an input video comprising a plurality of sections, and metadata associated with the input video, at least two sections of the plurality of sections of the input video having different frame rates; and performing real-time processing on the input video according to the metadata, so as to output an output video having a constant target frame rate in real time, wherein the metadata includes frames indicating various sections of the input video rate information, or the metadata includes information indicating the frame rate of each section of the input video and at least one of the following information: information indicating a target frame rate and information indicating a processing operation to be used for performing real-time processing on the input video.

24 Claims, 4 Drawing Sheets

| Reel 1 (24fps) | Reel 2 (24fps) | Reel 3 (24fps) | ... | Reel N (24fps) |

| Section 1 (24fps) | Section 2 (120fps) | Section 3 (48fps) | ... | Section N (24fps) |

METHOD FOR VIDEO PROCESSING, AN ELECTRONIC DEVICE FOR VIDEO PLAYBACK AND A VIDEO PLAYBACK SYSTEM

TECHNICAL FIELD

The present disclosure relates to a method for video processing and a corresponding computer-readable medium, a player device for video playback, and a video playback system. In particular, the present disclosure relates to a method of processing a movie for theatrical exhibition, a movie player device, and a movie playback system.

TECHNICAL BACKGROUND

Traditionally, movies are shot and played at a frame rate of 24 frames per second (FPS). The 24 FPS frame rate is determined as the trade-off between the visual perception of video continuity by human eyes and technical constraints. With the development of technology in the film industry, technologies that have emerged in recent years (such as digital film technology as the replacement of analog film) have allowed filming at higher frame rates, thereby providing a smoother visual experience.

However, the existing movie production, post production, distribution and exhibition technologies that support high frame rates often require significant costs on equipment, storage, transmission bandwidth, personnel and on other cost heads.

Therefore, there is a need for a solution that supports high frame rate video/movie exhibition and saves costs on equipment, storage, transmission bandwidth, and other cost heads.

INVENTION SUMMARY

The present disclosure provides a solution that supports video exhibition at a constant high frame rate while saving costs.

According to an aspect of the present disclosure, a method for video processing is provided, the method for video processing comprising receiving an input video comprising a plurality of sections, and metadata associated with the input video, at least two sections of the plurality of sections of the input video having different frame rates; and performing real-time processing on the input video according to the metadata, so as to output an output video with a constant target frame rate in real-time, wherein, the metadata comprising information indicating the frame rate of each section of the input video; or the metadata comprising information indicating the frame rate of each section of the input video and at least one of the following information: information indicating the target frame rate and information indicating a processing operation to be used for performing real-time processing on the input video.

According to an aspect of the present disclosure, an electronic device for video playback is provided, the player device comprising a processor and a memory having computer-executable instructions stored thereon, the computer-executable instructions, when executed by the processor, causing the processor to perform the video processing method as described in this disclosure.

According to an aspect of the present disclosure, a computer-readable medium having computer-executable instructions stored thereon, when the computer-executable instructions are executed by a processor, cause the processor to perform the video processing method as described in the present disclosure.

According to an aspect of the present disclosure, a video playback system is provided, including: the electronic device for video playback as described in the present disclosure and a display device, the electronic device transmits the output video to the display device in real time, so as to display the output video by the display device.

DRAWINGS

The accompanying drawings, which are incorporated in and constitute a part of the specification, illustrate embodiments of the present disclosure and are used in conjunction with the description to explain the principles of the present disclosure.

DETAILED DESCRIPTION

Figures 1, 2:
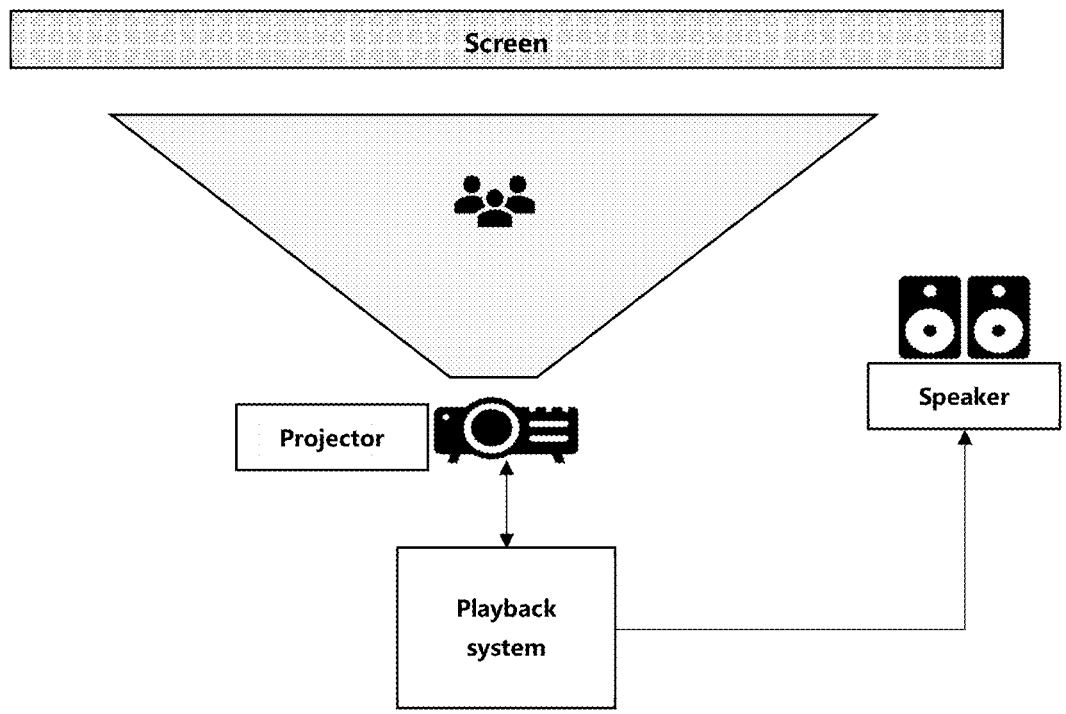
FIG. 1 is a schematic diagram of a movie content including multiple reels as input video data of a player device, according to the prior art.
FIG. 2 is a schematic diagram of a video playback system, according to an embodiment of the present disclosure.

Preferred embodiments of the present disclosure will be described in detail below with reference to the accompanying drawings.

In this section, representative applications of a device and a method according to the embodiments described herein are provided. These examples are provided only to add context and to aid in understanding the described implementations. It will therefore be apparent to those skilled in the art that the implementations described in this disclosure can be practiced without some or all of these specific details. In other instances, well-known process steps have not been described in detail in order to avoid unnecessarily obscuring the implementations described herein. Other applications are also possible, so that the following examples should not be considered as limiting.

Note that similar reference numerals and letters refer to similar items in the figures, thus once an item is defined in a figure, it is not necessarily to be discussed in the subsequent figures.

In the existing technology for movie exhibition, only input video with a constant frame rate is supported. Generally, the movie content as input video data of the player device usually includes a plurality of sections called reels, each of which corresponds to a part of the movie content. According to the requirements of the existing film standards, for example, the requirements of the Digital Cinema Package (DCP) proposed by the Digital Cinema Initiative (DCI), each reel of the movie content packaged into the DCP must have the same frame rate. That said, the entire movie content as input video data has a constant input frame rate. As shown in FIG. 1, the movie content as input video data of the player device can be packaged into a digital movie package with N number of reels, and the frame rates of the N reels are all 24 FPS, for example.

Therefore, according to the existing movie exhibition technology, in order to play a high frame rate input video, the input video itself must have a constant high frame rate (for example, the frame rate of each reel is 120 FPS), which requires the entire movie being shot at a constant high frame rate. However, since high frame rate means more frames per second, this high frame rate shooting/rendering method throughout the entire movie causes very large costs in equipment, storage, transmission bandwidth and many other cost heads. For example, in the movie shooting/production stage, expensive rendering equipment needs to be used throughout the process to support a high frame rate, and personnel at sufficiently professional level are required to control such equipment to complete the shooting and production of the movie. On the other hand, because shooting at a high frame rate requires a larger amount of data to be stored, the storage costs on the movie shooting end, post-production end, and exhibition end (such as cinemas, and the like) also become very large. In addition, a large amount of data leads to the need for greater bandwidth to distribute high-frame-rate movies compared to traditional low-frame-rate movies. Such a requirement for bandwidth particularly imposes wider restrictions on home playback scenarios where OTT or set-top box type terminals are used.

In fact, although motion scenes such as scenes of wars and sports that change rapidly over time can benefit from a high frame rate and become clearer and smoother, not the exhibition effect of every type of scene will improve as the frame rate increases. For example, the clarity and continuity of still scenes will not significantly improve with the increase in frame rate. A still scene means a scene in which only a small part of the involved scene moves/changes with time, or the picture changes slowly with time. Examples of still scenes are landscape scenes where the picture is relatively still and scenes that contain only a small portion of body movement (for example, speeches, news broadcast scenes, and the like, where only the speaker's mouth moves over time).

In view of the above factors, shooting movies/videos at non-constant frame rates (for example, motion scenes are shot at a high frame rate whilst still scenes are shot at a low frame rate), to reduce the large overhead in terms of equipment, storage, transmission bandwidth, and the like is considered.

However, direct playback of movies/videos shot at non-constant frame rates requires improvements made to each and every device in the video/movie playback system including player device(s), display device(s), audio device(s), and the like, especially for the display device(s), which is required to enable display of variable frame rate image, and the display device(s) is required to seamlessly switch between each and every frame rate. Such high requirement on display device(s) often makes it difficult to support the exhibition of movie(s)/video(s) shot at non-constant frame rates in various circumstances. For example, in the case that multiple display devices receive the movies/videos transmitted by a centralized player device through a network and locally display the received movies/videos separately, each display device involved is required to be able to support exhibition of movies/videos shot at non-constant frame rates. This is disadvantageous for home scenarios where movies are played via set-top boxes or OTTs, because this requires that each home must be equipped with a display that supports the display of movies/videos shot at non-constant frame rates. As another example, for the case of commercial cinema exhibition, pursuant to the abovementioned current movie industry standards, cinemas require constant frame rate capable display device (generally projectors), which makes the disadvantages resulting from the restrictions of the display device more severe, in the context of videos/movies with variable frame rates. For example, such display devices are typically very expensive equipment and are likely to be used for more than a decade without replacement. As of today, no such commercial display device that can seamlessly display a video with variable frame rates is available in the market. Thereby, the present disclosure on one hand provides a solution that supports playback of movies/videos shot at non-fixed frame rates at a constant frame rate (for example, a high frame rate such as 120 FPS), thus enabling the saving of the equipment and storage costs of the production and exhibition ends of the movie/video and reducing the bandwidth requirements for distributing the movie/video. On the other hand, this solution can be applied to video player device(s), causing that only the player device(s) in the entire video/movie playback system need to be improved, and can be compatible with other existing devices such as display device(s).

FIG. 2 illustrates a video playback system 200, according to an embodiment of the present disclosure. FIG. 2 illustrates a video playback system in a typical movie theater. As shown in FIG. 2, the video playback system 200 may include a player device, an audio device such as a speaker and the like, a projector, a screen, and the like, among which the projector and the screen together constitute the display device. Although FIG. 2 shows a display device composed of a projector and a screen, it should be understood that the video playback system 200 according to the present disclosure may include any type of display device(s), such as a cathode ray tube display (CTR), liquid crystal display (LCD), light emitting diode display (LED), and the like. Any conventional display device and/or audio device may be used for the video playback system 200, according to the present disclosure.

In the video playback system according to the present disclosure, the player device may receive an input video comprising a plurality of sections, and metadata associated with the input video, at least two of the plurality of sections of the input video sections having different frame rates; and the player device can process the input video in real time according to the metadata, so as to output in real time an output video with a constant target frame rate (for example, a constant high frame rate such as 120 FPS), wherein the metadata includes information indicating the frame rate of each section of the input video, or alternatively, the metadata includes information indicating the frame rate of each section of the input video and at least one of the following: information indicating a target frame rate and information indicating the processing operation to be used for real-time processing of the input video.

The player device according to the present disclosure can convert an input video with a non-constant frame rate to an output video with a constant frame rate in real time, and transmit the output video to a corresponding display device in real time for playback, thereby enabling reduction of costs and compatibility with existing display devices.

FIG. 2 illustrates an exemplary video playback system typically used in movie theaters, where the player device(s), audio device(s), and display device(s) are in the same geographic location. However, the present disclosure is not limited to video playback systems applied to movie theaters. For example, the video playback system according to the present disclosure may also be a distributed video playback system with a centralized player device and multiple display devices and/or audio devices distributed in various different geographical locations. In this case, the centralized player device can perform, in a centralized manner, video processing according to the present disclosure on the video to be played, and transmit the processed output video to each display device in real time for local display. A typical example of this case may be a case that a centralized player device processes the video according to the present disclosure and transmits it to various home display devices (such as via a set-top box or OTT) to play a movie at home.

The exemplary video playback system according to the present disclosure is briefly described above with reference to FIG. 2, and the embodiments of the present disclosure will be described in detail below with reference to the drawings.

Figures 3, 4:
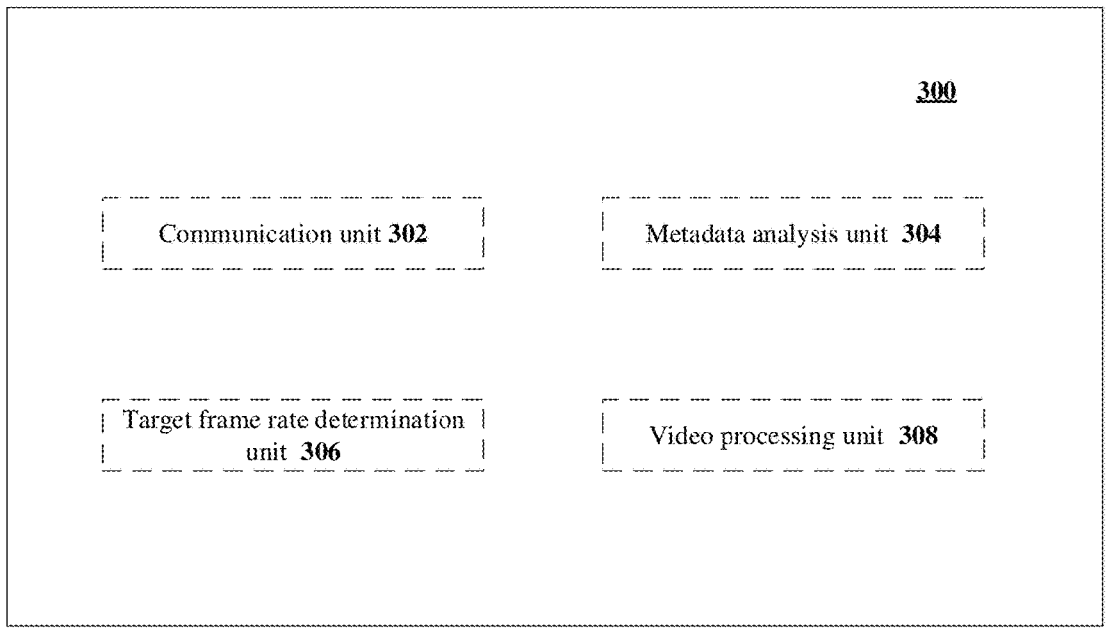
FIG. 3 is a schematic diagram of a structural configuration of an electronic device for video playback, according to an embodiment of the present disclosure.
FIG. 4 is a schematic diagram of movie content including multiple sections as electronic video data of a player device, according to an embodiment of the present disclosure.

FIG. 3 shows a schematic structural configuration of an electronic device for video playback (hereinafter simply referred to as a player device 300) according to an embodiment of the present disclosure. As shown in FIG. 3, the player device 300 may include a communication unit 302, a metadata analysis unit 304, a target frame rate determination unit 306, and a video processing unit 308. Although FIG. 3 illustrates the above four units, the player device 300 may also include other possible units, or a combination of units including any of the above four units.

The communication unit 302 is configured, for example, to receive an input video including a plurality of sections and metadata associated with the input video, and output in real time an output video with a constant target frame rate generated by the video processing unit processing the input video, wherein at least two of the plurality of sections of the input video having different frame rates.

According to the present disclosure, the communication unit 302 may directly read an input video (for example, a movie) from the storage device associated with the player device. Alternatively, the communication unit 302 may receive the video to be played from the remote device in real time through any communication means (such as via the Internet, a local area network).

According to the present disclosure, the input video may be video data having a plurality of sections with different frame rates. FIG. 4 shows a schematic diagram of a movie content including multiple sections as input video data of a player device according to an embodiment of the present disclosure. As shown in FIG. 4, the input video may include N number of sections, wherein, at least two of the N sections having different frame rates. For example, as shown in FIG. 4, the frame rate of section 1 is 24 FPS, the frame rate of section 2 is 120 FPS, and the frame rate of section 3 is 48 FPS. The frame rate of each section may be determined based on the sense of motion of the picture corresponding to the section at the time of video shooting. For example, in order to make the exhibition effect of the motion scene clearer and smoother, the motion scene section may be shot at a frame rate higher than that of the still scene section. In other words, the frame rate of the section containing the motion scene of the input video is higher than the frame rate of the section containing the still scene of the input video. For example, as shown in FIG. 4, section 1 may correspond to an image section such as a landscape scene whose picture is basically still, and section 2 may correspond to a scene whose picture changes rapidly with time, such as a fierce war scene or a sports scene, and section 3 may correspond to a scene where the dynamic sense of the picture is medium (for example, a small part of the picture changes with time, or the rate of change of the picture with time is relatively slow), such as a character dialogue or news broadcast scene.

According to the present disclosure, at least two sections of the input video having different frame rates should be understood as not all N number of sections of the input video must have N number of frame rates different with each other. For example, as shown in FIG. 4, the frame rates of section 1 and section N may be the same, both being 24 FPS. In addition, two adjacent sections do not necessarily have different frame rates. For example, although not shown, section 4 may have the same frame rate as section 3, that said, 48 FPS.

It should be noted that the input video data can be divided into sections according to any existing video/movie standards. For example, the movie content can be packaged into a digital movie package (DCP) with multiple reels according to the DCI standard as the input video. It should be pointed out that the length of each section may be the same or different, as long as the video processing unit can identify each section.

According to the present disclosure, the communication unit 302 may receive metadata as a file separate from the input video in a separate manner. Or alternatively, the communication unit 302 may also receive input video data embedded with metadata as a whole. The metadata under the present disclosure will be described in detail below with reference to the metadata analysis unit 304.

The communication unit 302 may transmit the output video with a constant target frame rate generated by the video processing unit processing the input video to the corresponding display device via any communication means. For example, the communication unit 302 may transmit the output video to the display device by any suitable video transmission cable coupling the player device and the display device. As another example, the communication unit 302 may also transmit the output video to a remote display device via a network such as the Internet or a local area network.

Preferably, the communication unit 302 can transmit the output video in real time. That said, the communication unit 302 can output the processed output video in time as the video processing unit 308 processes the input video without storing the entire output video corresponding to the entire input video locally. Since the processed output video generally has a constant high frame rate, in other words, the output video generally has more frames than the input video; it can be advantageous to transmit the processed output video in real time without storing the entire output video to save storage costs at the player device. However, it should be understood that transmitting the output video in real time is only a preferred implementation, and the communication unit 302 may also transmit the stored output video to the corresponding display device after the video processing unit 308 finishes processing the entire input video.

The metadata analysis unit 304 may analyze the received metadata associated with the input video to extract the required information. According to the present disclosure, the metadata associated with the input video may include information indicating the frame rate of each section of the input video, or information indicating the frame rate of each section of the input video and at least one of the following: information indicating the target frame rate and information indicating the processing operation/processing method to be used for real-time processing of the input video. In other words, the metadata may indicate the frame rate of each section of the input video, and optionally the metadata may also indicate the target frame rate of the output video and/or the processing operation to be used to process the input video.

Specifically, the metadata may include only information indicating the frame rate of each section of the input video, so that the target frame rate determination unit 306 may determine the target frame rate to be used for outputting the video according to the frame rate information. In this case, the video processing unit 308 will process the input video according to a default video processing method to output the output video with a constant frame rate. In addition, it may be desirable to play the video at a specified constant rate, and/or to process the input video with specific video processing operation(s) (for example, a movie/video creator may desire such a designation). In this case, in addition to the frame rate information of each section, the metadata may include information indicating a target frame rate of the output video and/or a processing operation to be used to process the input video. Such a way of designating the target frame rate and/or video processing operation can make the player device extensible, so as to enable at least, for example, flexible determination of the target frame rate of the output video and/or the processing operation of the input video, according to the variety of input video.

As described above, the metadata may be received as a file separate from the input video in a separate manner, or alternatively, the metadata may be embedded in the input video data and received as a whole with the input video.

In the case of receiving metadata as a separate file, the metadata may store information indicating the frame rate of each section and/or the target frame rate and/or the video processing operation of the input video in any appropriate format, and be received before transmission of the input video (for example, via the communication unit 302). For example, the metadata may be metadata in a format such as XML containing elements and attributes. For example, metadata can be embedded in an XML format Digital Rights Management (DRM) key file, where the DRM key file is a file sent separately from the video data to "unlock" the video content for playback. Alternatively, the metadata may also have other formats. For example, the metadata may be organized into a metadata file according to fields, each field corresponding to different information of the input video. The metadata analysis unit 304 can read and parse the content in each element-attribute or field contained in the metadata transmitted as an independent file, thereby extracting the corresponding information. The DRM key file herein is used as an example to describe the case of metadata being separate from the input video. It can be understood that the metadata can be any file other than the DMR key file, as long as the file is received and interpreted by the player device before starting processing the input video.

In the case that the metadata is received along with the input video as a whole, the metadata may be embedded in the input video data. For example, the metadata as a specific field or tag together with the input video may be transmitted as input video data. In this case, for example, the metadata can be embedded in the Composition Playlist (CPL) file of the digital movie package in XML format. Or alternatively, the metadata may be embedded in the header of the data packet encapsulating the input video, so that the metadata analysis unit 304 could analyze and extract the information in the metadata before starting to receive the input data and processing it in real time. The CPL file herein is used as an example to illustrate the case of metadata being embedded in the input video data. Any other file may also be used as a medium for both input video and metadata, as long as the file can be received and interpreted by the player device.

According to the present disclosure, the target frame rate determination unit 306 may be configured to determine the target frame rate by the following operation: in the case that the metadata does not comprise information indicating the target frame rate, determining the target frame rate based on the maximum frame rate supported by a display device displaying the output video and/or frame rates of the sections of the input video; and in the case that the metadata includes information indicating the target frame rate, determining the smaller one of the indicated target frame rate and the maximum frame rate supported by a display device displaying the output video as the target frame rate.

As explained above, the present disclosure aims to provide a technology capable of playing movies/videos that are not entirely shot at a high frame rate, thereby reducing the costs on equipment, storage, transmission bandwidth, and the like, nearly without affecting the clarity/smoothness. Therefore, it is desirable to determine the target frame rate of the output video to the largest possible frame rate, thereby providing the highest possible clarity/smoothness. Therefore, according to the present disclosure, the target frame rate is larger than or equal to the minimum frame rate among the frame rates of the various sections of the input video.

However, in consideration of the display capabilities of the display device(s), some display devices cannot support high frame rates such as 120 FPS. Therefore, the target frame rate determination unit 306 needs to consider the maximum frame rate supported by the display device displaying the output video to determine the target frame rate. For example, in the case that a target frame rate is specified in the metadata and the target frame rate is smaller than the maximum frame rate supported by the display device displaying the output video, the target frame rate determination unit 306 may determine the target frame rate indicated in the metadata as the final target frame rate. As another example, if the metadata specifies a target frame rate but the specified target frame rate is larger than the maximum frame rate supported by the display device displaying the output video, the target frame rate determination unit 306 may determine the maximum frame rate supported by the display device as the final target frame rate to utilize the display capabilities of the display device at a maximum degree to display as clear/smooth video as possible. It should be noted that the player device may collect the display capabilities of the display device associated with it in advance, so as to determine the target frame rate according to the display device outputting the video when playing the video.

In the case that the target frame rate is not specified in the metadata, the target frame rate determination unit 306 may determine the maximum frame rate supported by the display device as the target frame rate. Advantageously, this target frame rate determination approach can maximize the capabilities of the display device to the largest extent as possible, so that video can be played at the highest possible frame rate as clear/smooth as possible.

When the target frame rate is not specified in the metadata, if there is a least common multiple among the frame rates of the sections of the input video and if such least common multiple is smaller than or equal to the maximum frame rate supported by the display device, the target frame rate determination unit 306 may also determine the least common multiple as the target frame rate. Advantageously, this target frame rate determination approach can simplify the video processing procedure of the video processing unit, so as to obtain an output video with a constant frame rate with a relatively low calculation cost, which will be described in detail below.

According to the present disclosure, in the case that the target frame rate is not specified in the metadata, the target frame rate determination unit 306 may also determine the target frame rate in any other manner as long as the target frame rate is smaller than or equal to the maximum frame rate supported by the display device.

According to the present disclosure, in the case that there are multiple display devices (for example, in the case of the distributed video playback system described above), the target frame rate determination unit 306 of the player device 300 may determine one common target frame rate to the multiple display devices. For example, the target frame rate determination unit 306 may determine the common target frame rate based on the frame rate supported by the display device with the lowest capability among all display devices, that said, the minimum supported frame rate. For example, the target frame rate may be determined based on the frame rates of the sections of the input video and the minimum supported frame rate; or the target frame rate may be determined as the smaller one of the metadata indicated target frame rate and the minimum supported frame rate.

Alternatively, in the case that there are multiple display devices, the target frame rate determination unit 306 of the player device 300 may determine multiple target frame rates, and each target frame rate is shared by one or more display devices. For example, the target frame rate determination unit 306 may group display devices according to display capabilities (for example, a high target frame rate group, a medium target frame rate group, and a low target frame rate group, and the like), and within each group, the common target frame rate for the group may be determined based on the frame rate supported by the display device with the lowest capability as described above. In this way, the player device can process the input video at each common target frame rate in parallel, to obtain multiple output videos and transmit the corresponding output video to the corresponding display device according to the above grouping, where each output video has a different constant frame rate. Alternatively, all generated output videos may be transmitted in parallel, and the display end may select an appropriate output video to display according to the actual capabilities of the display device.

It is to be noted that, according to the present disclosure, the determined target frame rate may be larger than, equal to or smaller than the maximum frame rate among the frame rates of all sections of the input video. Through the video processing procedure of the video processing unit 308, the input video can be played at any target frame rate, which will be described in detail below.

According to the present disclosure, the video processing unit 308 may process the input video to output the output video with a constant target frame rate. Preferably, the video processing unit 308 may perform real-time processing on the input video, that said, outputting the output video with a constant target frame rate without storing the complete output video corresponding to the entire input video. In the case of such real-time processing, the player device may be associated with a memory or a buffer to temporarily store some frames required for video processing. In the case of real-time processing, the player device 300 does not need to store the entire output video, so advantageously, the storage costs can be reduced.

According to the present disclosure, in the case that the metadata does not comprise information indicating a processing operation to be used for real-time processing of the input video, the video processing unit 308 may perform a default method to process the input video (for example, in real time). For example, such a default method may be a method of repeatedly outputting certain frames so that frame rate(s) smaller than the target frame rate of section(s) reaches the target frame rate and/or a method of deleting certain frames so that frame rate(s) larger than the target frame rate of section(s) reaches the target frame rate.

Such a default method may include, for example, performing the following operations: calculating the timing for outputting each frame of the input video based on the target frame rate determined by the target frame rate determination unit; and outputting each frame according to the calculated timing, wherein, for a section with a frame rate smaller than the target frame rate of the input video, outputting one or more frames of the section repeatedly according to the timing; for a section with a frame rate equal to the target frame rate of the input video, outputting the frames of the section according to the timing; and for a section of the input video with a frame rate larger than the target frame rate of the input video, discarding part of the frames of the section and outputting the remaining frames of the section according to the timing.

Specifically, the video processing unit 308 may first calculate the timing of each frame to output the input video, based on the target frame rate determined by the target frame rate determination unit. For example, the timing to output a corresponding frame within 1 second can be determined at intervals of "1/target frame rate". For example, assuming that the target frame rate is determined to be 120 FPS, then for a period of 1 second starting at time T, 120 frames will be output at timing T, T+1/120, T+2/120, T+3/120, . . . , T+119/120.

Subsequently or in synchronization with the timing calculation, the video processing unit 308 may determine the frame to be output at each timing, based on the target frame rate and the frame rates of the sections. For the section where the frame rate of the input video is smaller than the target frame rate, the video processing unit 308 repeatedly outputs one or more frames in the section to enable one frame to be output at each timing, that said, to supplement frames to be output in a period of time. There are many methods for supplementing frames to be output within a period of time. According to one embodiment, any one frame (for example, the first frame or the last frame) of each second of the section can be simply repeated so that the number of frames in the second reaches the number of frames corresponding to the target frame rate. For example, assuming that the target frame rate is 30 FPS and the frame rate of the section is 24 FPS, any one frame of each second in the section can be simply (such as the first frame or the last frame) output repeatedly for 6 consecutive times so that 30 frames are output in one second.

According to another embodiment, in order to make the section with a frame rate smaller than the target frame rate look more coherent, one or more frames of the section may be repeatedly output according to the calculated timing based on a proportional relationship between the frame rate of the section and the target frame rate. Specifically, two consecutive frames in the section may be repeated by the number of times represented by the values of the numerator and denominator of the ratio respectively, and similar operations can be performed on subsequent frames in the section. For example, if the target frame rate is 120 FPS and the frame rate of the section is 48 FPS, then the ratio of the frame rate of the section to the target frame rate is 2:5, then according to the timing calculated based on intervals of 1/120, the first frame in the first second of the section can be output twice, the second frame can be output five times, the third frame can be output twice, and the fourth frame can be output five times, and so on, so that 120 frames can be output in the first second. In this way, because each frame in the section can be repeated at a certain ratio to avoid excessive repetition of one or a few frames, the output video will look smoother.

According to a variation in this embodiment, when the target frame rate is determined as the least common multiple of the frame rate of each section as described above, this operation of repeatedly outputting frames in a proportional relationship will become simpler. Specifically, according to the corresponding multiplication relationship between the target frame rate and the frame rate of each section, each frame of each section may be repeated corresponding to the multiple value. For example, assuming that the input video includes sections with frame rates of 24 FPS, 48 FPS, and 96 FPS, respectively, and the target frame rate is determined to be the least common multiple among these frame rates, that said, 96 FPS. For a section with a frame rate of 24 FPS, the target frame rate is 4 times the frame rate of the section, then each frame in the section can be repeatedly output 4 times at the timing calculated based on intervals of 1/96 to get an output video with a frame rate of 96 FPS. Similarly, for a section with a frame rate of 48 FPS, the target frame rate is twice the frame rate of the section, then each frame in the section can be repeatedly output twice at the timing calculated based on intervals of 1/96 to get an output video with a frame rate of 96 FPS. In the case of repeatedly outputting each frame according to the multiplication relationship, since each frame in each section is repeated a uniform number of times, the calculation is simpler.

Herein, for a section whose frame rate is smaller than the target frame rate, a method of repeatedly outputting certain frames so that the frame rate of the section smaller than the target frame rate reaches the target frame rate is introduced in a preferred manner. In fact, other methods for supplementing the number of frames can also be used. For example, the video processing unit 308 may adopt any known frame interpolation-based algorithm (for example, linear time interpolation, and the like) as the default method to process the input video (for example, in real time).

For the section of the input video where the frame rate is greater than the target frame rate, the video processing unit 308 may discard the output of one or more frames in the section to make the number of frames output within the duration of the section correspond to the target frame rate. According to one embodiment, one or more frames in the section can be discarded based on the proportional relationship between the frame rate of the section and the target frame rate, and the remaining frames can be output at the calculated timing. Specifically, the frames in the section can be divided into successive groups according to the value of the numerator and denominator of the ratio, and one or more frames within each group can be discarded in any way, so that each group has only one remaining frame. For example, if the target frame rate is 48 FPS, and the frame rate of the section is 120 FPS, then the ratio of the frame rate of the section to the target frame rate is 5:2, then the frames of the section can be divided into multiple groups including 5 frames and including 2 frames successively in a respective group, and only one frame within each group of the section is output at the timing calculated based on intervals of 1/48 seconds. For example, for the first group of the section that includes 5 frames, only the first frame will be output and the remaining 4 frames be discarded (that said, the remaining 4 frames are not output), and at the next timing for the first group of the section that includes 2 frames, first frame will be output and the other frame be discarded, and so on. According to the present disclosure, the frames to be retained or discarded in each group may be arbitrarily determined, as long as only one frame is guaranteed to be output in each group according to the timing. In this case of discarding frames in proportion, since the frames are discarded relatively evenly within a section, the output video will not have obvious "discarded frames" which will affect the visual experience. It should be understood that other ways of discarding frames may also be used, as long as the frame rate of the output video is equal to the target frame rate.

Advantageously, the solution according to the present disclosure also supports override/expansion of the default video processing operation adopted by the video processing unit 308. For example, the specific video processing operation to be performed by the video processing unit 308 may be instructed by metadata to enable the video to be output at a constant target frame rate. The processing operations on the input video (such as real-time processing) include at least one or more of the following operations on the frames of the input video: frame interpolation, frame repetition, and frame discarding. In this case, the player device may pre-load multiple specific processing operations/algorithms and select a processing operation for processing based on the information in the metadata specifying the processing operation. This method brings greater flexibility to video processing. For example, the most appropriate video processing operation can be flexibly specified according to the content of the movie/video, so as to achieve the optimal video playback effect. In addition, other video processing operations can also be indicated, other than the frame rate conversion operation of adjusting the frame rate of the input video to the target frame rate for output. For example, some specific rendering operations applied to one or more sections may also be indicated, so that each section is played according to a specific effect, thereby enhancing the visual experience.

The structural configuration of the player device 300 according to the present disclosure has been explained in detail above. Hereinafter, a schematic operational flow 500 of a player device for video playback according to an embodiment of the present disclosure will be described with reference to FIG. 5.

Figure 5:
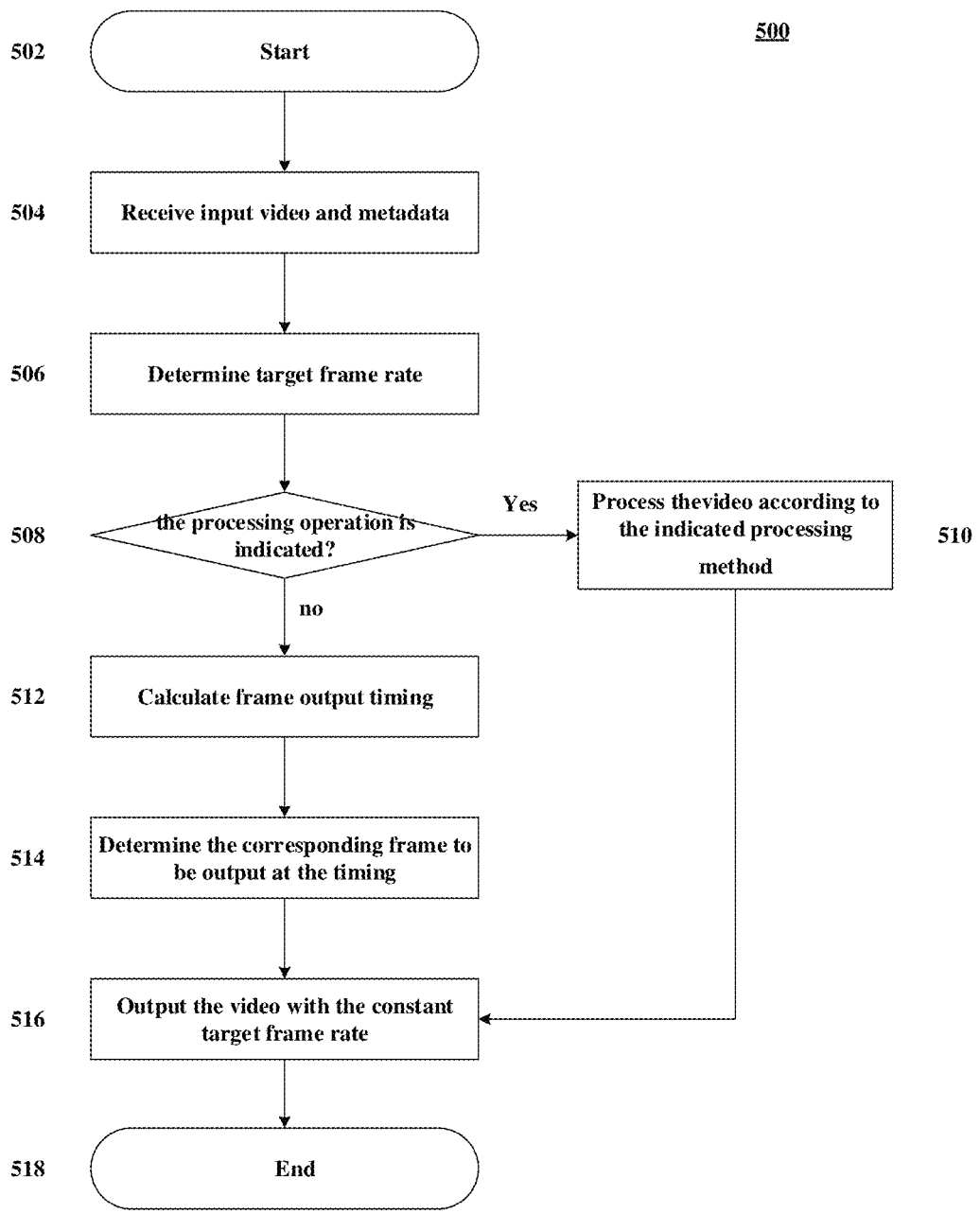
FIG. 5 is a flowchart of a schematic operational flow of a player device for video playback, according to an embodiment of the present disclosure.

As shown in FIG. 5, the operational flow 500 starts at step 502. Subsequently, at step 504, the player device receives an input video including a plurality of sections and metadata associated with the input video, wherein at least two sections of the plurality of sections of the input video have different frame rates. As shown above, the input video and the metadata associated with the input video may be received separately, or the input video data with embedded metadata may be received as a whole. The metadata may include information required to process the input video. For example, the metadata may include information indicating the frame rate of each section of the input video. In order to enable the video processing operations of the player device to be flexibly set/expanded, the metadata may also optionally include information indicating the target frame rate and/or information indicating the processing operation to be used for real-time processing of the input video. The details of the metadata have been described above with reference to the metadata analysis unit 304, and will not be repeated here.

Subsequently, at step 506, the player device analyzes the received metadata as described above, and determines the target frame rate, according to the analyzed information related to the frame rate (such as the indicated target frame rate or frame rates of the sections of the input video) and the maximum frame rate supported by the display device to display the output video. As described above, in the case that the metadata includes information indicating the target frame rate, the player device may determine the smaller one of the indicated target frame rate and the maximum frame rate supported by the display device displaying the output video as the target frame rate. In the case that the metadata does not comprise information indicating the target frame rate, the player device may determine the target frame rate based on the maximum frame rate supported by the display device displaying the output video and/or the frame rates of the sections of the input video. For example, in the case that the metadata does not specify the target frame rate, in order to make the operation of video processing easier, if the frame rates of each section of the input video have a least common multiple and the least common multiple is smaller than or equal to the maximum supported by the display device, in the case, the target frame rate is determined as such least common multiple.

Subsequently, at step 508, the player device determines whether to use the default video processing operation or the video processing operation indicated in the metadata to process the input video, according to the analysis results of the received metadata. Specifically, if the metadata contains information indicating a processing operation to be used for real-time processing of the input video, the operational flow 500 proceeds to step 510. At step 510, based on the determined target frame rate, the input video is processed according to the designated processing operation. For example, operations such as frame interpolation, frame repetition, and/or frame discarding may be performed on the input video based on a specific algorithm indicated in the metadata. In addition, as described above, special operations such as rendering can also be performed on the input video according to the specific operations indicated in the metadata. Subsequently, at step 516, the processed video with a constant target frame rate may be output.

If no specific processing operation is indicated in the metadata, the operational flow 500 continues with the default video processing operation and proceeds to step 512. At step 512, the timing of each frame to output the input video is calculated based on the determined target frame rate. As described above, for example, the timing to output the corresponding frame may be determined at intervals of "1/target frame rate".

Subsequently, at step 514, the frame to be output at each timing is determined based on the target frame rate and the frame rates of the sections. As mentioned above, for the section of the input video where the frame rate is smaller than the target frame rate, it is possible to determine, as described above, which frames are to be output repeatedly and how many times, in order to supplement the frames to be output within a period so that the target frame rate could be achieved. For the section of the input video where the frame rate is larger than the target frame rate, it can be determined which frames in the section are to be discarded so that the number of frames output during the section corresponds to the target frame rate. For example, one or more frames to be multiplicated and/or discarded may be determined based on the proportional relationship between the frame rate of the section and the target frame rate. And subsequently, at step 516, the processed video with a constant target frame rate is output.

Finally, the operational flow ends at 518.

It should be noted that the operational flow 500 of the player device according to the present disclosure is only illustrative, and those skilled in the art can modify the operational flow according to actual situations. The order of the various steps can be adjusted according to the situation or performed in parallel, for example, whether a specific video processing operation is indicated in the metadata can be determined before determining the target frame rate or substantially simultaneously. As another example, the step 514 of determining the corresponding frame to be output at timing can also be performed almost in parallel with the step 516 of outputting a video with a constant target frame rate. In this case, the frame may be output once certain timing for the frame to be output is determined.

It should be understood that each operation in the operational flow 500 of the player device according to the present disclosure may be understood as an operation that performs real-time processing on the input video. That said, the output video that has been generated can be output without the entire output video being processed and the complete output video being stored, so advantageously, the storage costs can be reduced.

The video processing method, the electronic device for video playback, and the video playback system according to the embodiments of the present disclosure have been described above with reference to the drawings.

In the solution of the present disclosure, since conversion of input video with non-constant frame rates into output video with a constant frame rate (for example, high frame rate) is supported, it is possible to shoot video/movies at non-constant frame rates (for example, still scenes of lower frame rate and motion scenes of higher frame rate). Thereby, it is possible to reduce the costs in many aspects such as equipment, storage, transmission bandwidth, and the like, while ensuring visual quality.

In the solution of the present disclosure, the player device performs the conversion of the video frame rate, thus enabling compatibility with any other existing devices of the video playback system (such as display devices, audio devices, and the like), without mandatory requirement on technology upgrades for devices other than the player device. In addition, because the output video has a constant frame rate, advantageously, the user can experience a "seamless" smooth picture, as if the video itself were shot at a constant frame rate, and the picture will not seem "discontinued/slit" between sections of the video due to switching frame rates, when displaying the video.

In the solution of the present disclosure, the input video is processed in real time, so that only certain frames can be temporarily stored when necessary, without storing a high frame rate output video containing a large number of frames at the video playback end.

In the solution of the present disclosure, the default frame rate conversion method only involves operations such as frame repetition and/or frame discarding, with very small calculation amounts, so the calculation costs of the video player device can also be reduced. In addition, in the solution of the present disclosure, specific video processing operations can be indicated through metadata; therefore, an extensible video processing mechanism is provided to enable flexible and personalized processing of input video.

Although the solution of the present disclosure has been described above by taking movie playback as an example, it should be understood that the solution of the present disclosure can be applied to any other used video playback scenarios.

Figure 6:
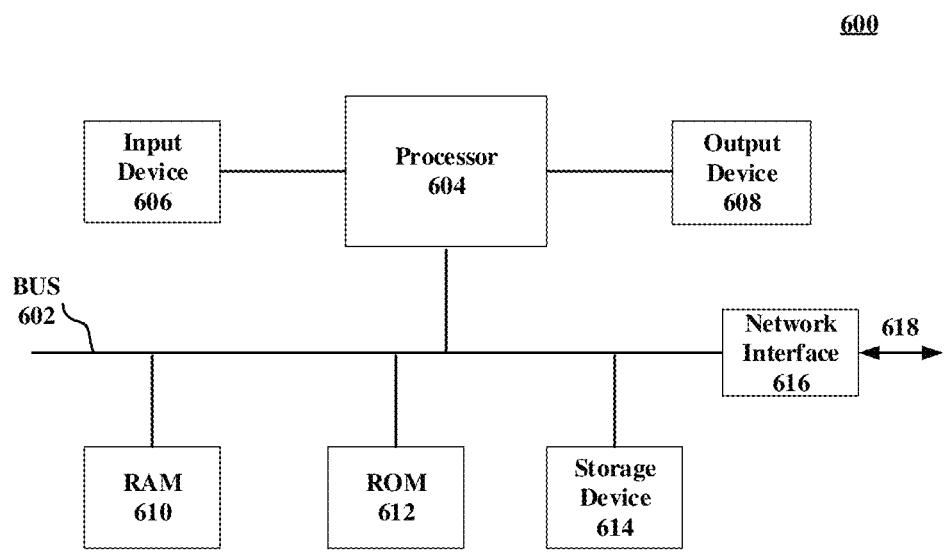
FIG. 6 is an exemplary configuration diagram of a computer device in which an embodiment according to the present disclosure can be implemented.

FIG. 6 illustrates an exemplary configuration of a computing device 600 that can implement an embodiment of the present disclosure. The computing device 600 is an example of an electronic device that can be used for video playback of the present disclosure. The computing device 600 may be any equipment configured to perform processing and/or calculations. The computing device 600 may be, but not limited to, a work station, server, desktop computer, laptop computer, tablet computer, personal data assistant (PDA), smart phone, in-vehicle computer, or a combination thereof.

As shown in FIG. 6, the computing device 600 may include one or more elements that may be connected or communicating with the bus 602 via one or more interfaces. The bus 602 may include, but is not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, and the like. The computing device 600 may include, for example, one or more processors 604, one or more input devices 606, and one or more output devices 608. The one or more processors 604 may be any kind of processors, and may include, but are not limited to, one or more general-purpose processors or special-purpose processors (such as dedicated processing chips). The input device 606 may be any type of input device capable of inputting information to a computing device, and may include, but is not limited to, a mouse, keyboard, touch screen, microphone, and/or remote controller. The output device 608 may be any type of device capable of presenting information, and may include, but is not limited to, a display, a speaker, a video/audio output terminal, a vibrator, and/or a printer.

The computing device 600 may also include or be connected to a non-transitory storage device 614, which may be any non-transitory storage device that can implement data storage, and may include but not limited to a disk drive, a optical storage device, a solid-state memory, a floppy disk, a flexible disks, a hard disk, a magnetic tape, or any other magnetic medium, a compact disk, or any other optical medium, a cache memory, and/or any other storage chip or module, and/or computer can read data from them, commands and/or code therefrom. The computing device 600 may also include random access memory (RAM) 610 and read-only memory (ROM) 612. The ROM 612 may store programs, utilities or processes to be executed in a nonvolatile manner. RAM 610 may provide volatile data storage and store instructions related to the operation of computing device 600. The computing device 600 may also include a network/bus interface 616 coupled to the data link 618. The network/bus interface 616 may be any kind of device or system capable of enabling communication with external devices and/or networks, and may include, but is not limited to, a modem, a network card, an infrared communication device, a wireless communication devices, and/or a chipset (such as a Bluetooth™ device, a 1302.11 device, a WiFi device, a WiMax device, a cellular communication facility, and the like).

It should be further understood that the elements of computing device 600 may be distributed throughout the network. For example, one processor may be used to perform some processes while using other remote processors to perform other processes. Other elements of computing device 600 may also be similarly distributed. Therefore, the computing device 600 may be understood as a distributed computing system that performs processes at multiple locations.

The various aspects, embodiments, implementations or features of the foregoing embodiments can be used individually or in any combination. The various aspects of the foregoing embodiments may be implemented by software, hardware, or a combination of hardware and software.

For example, the aforementioned embodiments may be embodied as computer-readable codes on a computer-readable medium. The computer-readable medium is any data storage device that can store data, which can thereafter be read by a computer system. Examples of computer-readable media include read-only memory, random access memory, CD-ROM, DVD, magnetic tape, hard disk drives, solid-state drives, and optical data storage devices. The computer-readable medium can also be distributed among network-coupled computer systems so that the computer-readable code is stored and executed in a distributed fashion.

For example, the aforementioned embodiment may take the form of a hardware circuit. Hardware circuits may include combinational logic circuits, clock storage devices (such as floppy disks, flip-flops, latches, and the like), finite state machines, memories such as static random access memory or embedded dynamic random access memory, custom design circuits, any combination of programmable logic arrays, and the like.

Although some specific embodiments of the present disclosure have been presented in detail by way of example, it should be understood by the skilled in the art that the above examples are intended to be illustrative only, not limiting the scope of the present disclosure. The above effects are merely illustrative effects, and the solution of the present disclosure may also have other technical effects. It should be appreciated that some steps of the foregoing method are not necessarily performed in the order illustrated; instead they may be performed simultaneously, in a different order, or in an overlapping manner. In addition, those skilled in the art may add some steps or omit some steps as needed. Some units in the foregoing device are not necessarily arranged as shown in the figure, and those skilled in the art may add some units or omit some units as needed. Those skilled in the art should understand that the foregoing embodiments can be modified without departing from the scope and essence of the present disclosure. The scope of the present disclosure is defined by the appended claims.

The invention claimed is:

1. A method for video processing, comprising:
receiving an input video comprising a plurality of sections, and metadata associated with the input video, at least two sections of the plurality of sections of the input video having different frame rates; and
performing real-time processing on the input video according to the metadata, so as to output an output video with a constant target frame rate in real-time,
wherein, the metadata comprises information indicating the frame rate of each section of the input video or the metadata comprises information indicating the frame rate of each section of the input video, and the metadata further comprises at least one of the following information: information indicating the target frame rate and information indicating a processing operation to be used for performing real-time processing on the input video, and
wherein the target frame rate is determined by:
in the case that the metadata does not comprise the information indicating the target frame rate, determining the target frame rate based on a maximum frame rate supported by a display device displaying the output video or frame rates of the plurality sections of the input video; and in the case that the metadata comprises the information indicating the target frame rate, determining a smaller one of the indicated target frame rate and the maximum frame rate supported by a display device displaying the output video as the target frame rate.

2. The method for video processing of claim 1, wherein, performing real-time processing on the input video means outputting the output video with the constant target frame rate without storing an entire output video corresponding to the input video.

3. The method for video processing of claim 1, wherein, in the case that the metadata does not comprise the information indicating a processing operation to be used for performing real-time processing on the input video, performing real-time processing on the input video comprises performing the following operations:

calculating a timing for outputting each frame of the input video based on the target frame rate; and outputting each frame according to the calculated timing, wherein:

for a first section with a first frame rate smaller than the target frame rate of the input video, outputting one or more frames of the first section repeatedly according to the calculated timing;

for a second section with a second frame rate equal to the target frame rate of the input video, outputting the frames of the second section according to the calculated timing; and for a third section with a third frame rate larger than the target frame rate of the input video, discarding one or more frames of the third section and outputting remaining frames of the third section according to the calculated timing.

4. The method for video processing of claim 3, wherein, for the first section, outputting one or more frames of the first section repeatedly according to the calculated timing based on a proportional relationship between the first frame rate of the first section and the target frame rate; and for the third section, discarding one or more frames of the third section based on a proportional relationship between the third frame rate of the third section and the target frame rate.

5. The method for video processing of claim 1, wherein, in the case that the metadata does not comprise the information indicating the target frame rate:

determining the maximum frame rate supported by the display device as the target frame rate; or if there is a least common multiple among the frame rates of the plurality of sections of the input video and the least common multiple is equal to or smaller than the maximum frame rate supported by the display device, determining the least common multiple as the target frame rate.

6. The method for video processing of claim 1, wherein, the processing operation to be used for performing real-time processing on the input video comprises performing one or more of the following operations on the input video: frame interpolation, frame repetition, and frame discarding.

7. The method for video processing of claim 1, wherein, a frame rate of a section containing a motion scene of the input video is larger than the frame rate of a section containing a still scene of the input video.

8. The method for video processing of claim 1, wherein, the method for video processing is executed by a player device.

9. The method for video processing of claim 1, wherein, the metadata is comprised in a file to be transmitted separately from the input video, or the metadata is embedded in a file used for transmitting the input video.

10. The method for video processing of claim 9, wherein, the metadata is comprised in a Composition Playlist (CPL) file, the metadata is comprised in a Digital Rights Management (DRM) key file, or the metadata data is embedded in a Composition Playlist (CPL) file.

11. An electronic device for video playback, the electronic device comprising a processor and a memory having computer-executable instructions stored thereon, when the computer-executable instructions are executed by the processor, cause the processor to perform a method for video processing, the method comprising:

receiving an input video comprising a plurality of sections, and metadata associated with the input video, at least two sections of the plurality of sections of the input video having different frame rates; and performing real-time processing on the input video according to the metadata, so as to output an output video with a constant target frame rate in real-time, wherein, the metadata comprises information indicating the frame rate of each section of the input video or the metadata comprises information indicating the frame rate of each section of the input video, and the metadata further comprises at least one of the following information: information indicating the target frame rate and information indicating a processing operation to be used for performing real-time processing on the input video, and wherein the target frame rate is equal to or larger than a minimum frame rate of frame rates of the plurality of sections of the input video.

12. A computer-readable storage medium having computer-executable instructions stored thereon, when the computer-executable instructions are executed by a processor, cause the processor to perform a method for video processing, the method comprising:

receiving an input video comprising a plurality of sections, and metadata associated with the input video, at least two sections of the plurality of sections of the input video having different frame rates; and performing real-time processing on the input video according to the metadata, so as to output an output video with a constant target frame rate in real-time, wherein, the metadata comprises information indicating the frame rate of each section of the input video or the metadata comprises information indicating the frame rate of each section of the input video, and the metadata further comprises at least one of the following information: information indicating the target frame rate and information indicating a processing operation to be used for performing real-time processing on the input video, and wherein the target frame rate is equal to or larger than a minimum frame rate of frame rates of the plurality of sections of the input video.

13. A video playback system, comprising:

a player for video playback, the player comprising a processor and a memory having computer-executable instructions stored thereon, when the computer-executable instructions are executed by the processor, cause the processor to perform a method for video processing, the method comprising:
receiving an input video comprising a plurality of sections, and metadata associated with the input video, at least two sections of the plurality of sections of the input video having different frame rates; and
performing real-time processing on the input video according to the metadata, so as to output an output video with a constant target frame rate in real-time, wherein, the metadata comprising information indicating the frame rate of each section of the input video; or the metadata comprising information indicating the frame rate of each section of the input video and at least one of the following information: information indicating the target frame rate and information indicating a processing operation to be used for performing real-time processing on the input video, and
wherein the target frame rate is equal to or larger than a minimum frame rate of frame rates of the plurality of sections of the input video; and
a display,
wherein the player is configured to transmit the output video to the display in real time, so as to display the output video by the display.

14. A method for video processing, comprising:
receiving an input video comprising a plurality of sections, and metadata associated with the input video, at least two sections of the plurality of sections of the input video having different frame rates; and
performing real-time processing on the input video according to the metadata, so as to output an output video with a constant target frame rate in real-time,
wherein the metadata comprises information indicating the frame rate of each section of the input video or the metadata comprises information indicating the frame rate of each section of the input video, and the metadata further comprises at least one of the following information: information indicating the target frame rate and information indicating a processing operation to be used for performing real-time processing on the input video, and
wherein the target frame rate is equal to or larger than a minimum frame rate of frame rates of the plurality of sections of the input video.

15. The method for video processing of claim 14, wherein,
performing real-time processing on the input video means outputting the output video with the constant target frame rate without storing an entire output video corresponding to the input video.

16. The method for video processing of claim 14, wherein,
in the case that the metadata does not comprise the information indicating a processing operation to be used for performing real-time processing on the input video, performing real-time processing on the input video comprises performing the following operations:
calculating a timing for outputting each frame of the input video based on the target frame rate; and
outputting each frame according to the calculated timing, wherein:
for a first section with a first frame rate smaller than the target frame rate of the input video, outputting one or more frames of the first section repeatedly according to the calculated timing;
for a second section with a second frame rate equal to the target frame rate of the input video, outputting the frames of the second section according to the calculated timing; and
for a third section with a third frame rate larger than the target frame rate of the input video, discarding one or more frames of the third section and outputting remaining frames of the third section according to the calculated timing.

17. The method for video processing of claim 16, wherein,
for the first section, outputting one or more frames of the first section repeatedly according to the calculated timing based on a proportional relationship between the first frame rate of the first section and the target frame rate; and
for the third section, discarding one or more frames of the third section based on a proportional relationship between the third frame rate of the third section and the target frame rate.

18. The method for video processing of claim 14, wherein the method for video processing further comprises determination of the target frame rate by:
in the case that the metadata does not comprise the information indicating the target frame rate, determining the target frame rate based on a maximum frame rate supported by a display device displaying the output video or frame rates of the plurality sections of the input video; and
in the case that the metadata comprises the information indicating the target frame rate, determining a smaller one of the indicated target frame rate and the maximum frame rate supported by a display device displaying the output video as the target frame rate.

19. The method for video processing of claim 18, wherein, in the case that the metadata does not comprise the information indicating the target frame rate:
determining the maximum frame rate supported by the display device as the target frame rate; or
if there is a least common multiple among the frame rates of the plurality of sections of the input video and the least common multiple is equal to or smaller than the maximum frame rate supported by the display device, determining the least common multiple as the target frame rate.

20. The method for video processing of claim 14, wherein, the processing operation to be used for performing real-time processing on the input video comprises performing one or more of the following operations on the input video: frame interpolation, frame repetition, and frame discarding.

21. The method for video processing of claim 14, wherein, a frame rate of a section containing a motion scene of the input video is larger than the frame rate of a section containing a still scene of the input video.

22. The method for video processing of claim 14, wherein, the method for video processing is executed by a player device.

23. The method for video processing of claim 14, wherein, the metadata is comprised in a file to be transmitted separately from the input video, or the metadata is embedded in a file used for transmitting the input video.

24. The method for video processing of claim 23, wherein, the metadata is comprised in a Composition Playlist (CPL) file, the metadata is comprised in a Digital Rights Management (DRM) key file, or the metadata data is embedded in a Composition Playlist (CPL) file.

* * * * *